United States Patent
Shibata et al.

[11] Patent Number: 6,007,355
[45] Date of Patent: *Dec. 28, 1999

[54] ROTARY CONNECTOR FOR CONNECTING CABLES

[75] Inventors: Masahiro Shibata; Mitsuo Tanaka; Ryusaku Koike, all of Tokyo, Japan

[73] Assignee: The Furukawa Electric Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/928,503

[22] Filed: Sep. 12, 1997

[30] Foreign Application Priority Data

Sep. 13, 1996 [JP] Japan .................................. 8-242413

[51] Int. Cl.⁶ ...................................... H01R 35/04

[52] U.S. Cl. .............................. 439/164; 439/15; 439/621

[58] Field of Search ............................ 439/164, 15, 621, 439/622

[56] References Cited

U.S. PATENT DOCUMENTS 5,683,259  11/1997  Sato ........................................ 439/164
5,762,507   6/1998  Mochizuki et al. .................... 439/164

*Primary Examiner*—Gary F. Paumen
*Attorney, Agent, or Firm*—Armstrong, Westerman, Hattori, McLeland & Naughton

[57] ABSTRACT

A rotary connector configured so as to enable extension or contraction of a cable transmitting electrical signals etc. by connecting a spirally wound flat cable between two cable parts and making the spirally wound flat cable wind or unwind using a rotary body and a fixed body, more particularly a rotary connector able to protect the flat cable from fusing when an overcurrent flows. The plus side connection portion of connection portions between conductors of a flat cable and an outer conductor (cable) electrically connects the conductors of the flat cable and the outer conductor through members having a fuse function. When a short-circuit occurs in the circuit including the flat cable and the outer conductor, the member having a fuse function fuses first so as to prevent the flat cable from heating and fusing.

14 Claims, 3 Drawing Sheets

ROTARY CONNECTOR FOR CONNECTING CABLES

BACKGROUND OF THE INVENTION

1. Field of the Invention

The prevent invention relates to a rotary connector configured so as to enable extension or contraction of a cable transmitting electrical signals etc. by connecting a spirally wound flat cable between two cable parts and making the spirally wound flat cable wind or unwind using a rotary body and a fixed body, more particularly relates to a rotary connector able to protect the flat cable from fusing when an overcurrent flows.

2. Description of the Related Art

When transmitting electrical signals over a cable, it is sometimes desired to increase or decrease the length of the cable. In addition, when attaching an electrical cable to the steering column of a car etc., it is necessary to prevent the cable from being stretched or sagging due to the rotation of the steering column.

In these cases, the objective can be achieved by giving the cable a sufficient extra length and allowing the cable to flex by that extra length, but there are limits to the extra length. If repeatedly flexed, further, stress fatigue will occur in the cable and it may break. Further, if the cable is allowed to sag by the excess length, it will cause difficulties in the arrangement of other parts and will detract from the appearance. Further, when laying such a cable in a car for the transmission of electrical signals, in many cases conditions do not allow excess lengths of cable to be laid or cable to flex by the excess length.

A rotary connector is used to overcome this disadvantage. An example of such a rotary connector is shown in FIG. 1 and FIG. 2. FIG. 1 is a perspective view of the appearance of a rotary connector, while FIG. 2 is a view of the parts of the rotary connector shown in FIG. 1 in a disassembled state.

The rotary connector illustrated is comprised of an inside case 1 and an outside case 2. The inside case 1 and outside case 2 are combined so as to be able to rotate relative with each other. The outside case 2 is integrally comprised of an upper cover 2a, a lower cover 2b, and an inlet portion 2c accommodating a connection portion. A spirally wound flat conductive cable, that is, a flat cable 4, is accommodated in a space 3 formed by the inside case 1 and outside case 2 when the outside case 2 and the inside case 1 are combined to be able to rotate relative to each other. In the illustrated example, the flat cable 4 is wound clockwise from the outside to the inside.

Cables, that is, outer conductors 5A and 5B (here referred to together as the outer conductors 5), are connected to the conductor portions at the two ends of the flat cable 4. In other words, the outer conductors 5A and 5B are connected through the flat cable 4. The connection portions 6A and 6B between the conductor portions at the two ends of the flat cable 4 and the outer conductors 5A and 5B are protected by molded pieces of plastic. The connection portion 6A is accommodated and affixed in the connection accommodating portion 1a of the inside case 1, while the connection portion 6B is accommodated and affixed in the connection accommodating portion 2c of the outside case 2.

A rotary connector structured in the above way can wind up the flat cable 4 spirally wound clockwise from the outside to the inside in the space 3 by the inside case 1 turning clockwise with respect to the outside case 2. Conversely, it can unwind the flat cable 4 spirally wound in the space 3 by the inside case 1 turning counterclockwise with respect to the outside case 2. When the flat cable 4 is wound in the counterclockwise direction from the outside to the inside, the relationship between the direction of rotation of the inside case 1 and the winding and unwinding of the flat cable 4 becomes opposite to the above.

Next, an example of the use of the above rotary connector will be explained. When connecting an electrical circuit the steering column of a car and supplying power or transmitting control signals to the electrical circuit through the outer conductors 5A and 5B from the outside, if the inside case 1 is affixed to the steering column and the outside case 2 is affixed near the steering column, the inside case 1 turns in accordance with the rotation of the steering column and the flat cable 4 is unwound or wound up. Since the distance between the ends of the outer conductors 5A and 5B does not change, however, the outer conductors 5A and 5B are not stretched or do not sag around the steering column. As a result, it is possible to supply power or transmit control signals from the outer conductors 5A and 5B without being limited by the rotation of the steering column.

FIG. 3 is a view showing an example of the configuration of the electrical circuit using a rotary connector of the above structure. This electrical circuit is comprised of a power supply side circuit provided with a battery 7 and a fuse box 8 connected at an external conductor 5B side connected to the flat cable 4 and a load 9 connected to the other external conductor 5A side connected to the flat cable 4. Reference numerals 5a are connection portions of the ends of the external conductors 5A and 5B and a wire harness. Reference numeral 6+ shows the plus (+) side connection portion connected to the positive (+) side of the power supplied from the battery 7, or the power supply side, among the connection portions 6A and 6B, while reference numeral 6 – shows the negative (−) side connection portion connected to the negative (−) side.

In the above mentioned rotary connector, however, when a short-circuit occurs somewhere in a circuit including the flat cable 4 and the outer conductors 5A and 5B shown in FIG. 3, specifically, when a short-circuit occurs at a circuit of the load 9 side, the problem is encountered of insufficient protection of the flat cable 4.

Explaining this in more detail, as shown in FIG. 3, a fuse box 8 for protection against overcurrent is connected to the positive terminal (+) side (power supply side) of the battery 7. When a short-circuit occurs in the circuit, the fuse provided in the fuse box 8 fuses due to the overcurrent and protects the circuit. The fuse provided in the fuse box 8 however is a large capacity one of about 10 to 15A (amperes) due to the relationship with the other loads etc. not shown. Since the flat cable 4 provided between the outer conductor 5A and the outer conductor 5B must have pliability, the cross-sectional area of the flat cable 4 is usually smaller than the cross-sectional area of the outer conductors 5A and 5B and so the current capacity of the flat cable 4 is smaller than the current capacity of the outer conductors 5A and 5B. That is, the fusing current of the flat current is naturally lower than the fusing current of the outer conductors 5A and 5B. Further, the value of the fusing current of the fuse of the fuse box 8 is normally designed in consideration of the outer conductors 5A and 5B, the load, etc. and is not designed in consideration of the current capacity of the flat cable 4. As a result, the fusing current of the flat cable 4 is often lower than the fusing current of the fuse. For example, the current capacity of the flat cable 4 is about 5 amperes. Therefore, with the above method of protection, the problem is encountered that when a short-circuit etc. occurs and an overcurrent flows to the electrical circuit, the flat cable 4 will heat and end up fusing due to the overcurrent before the fuse in the fuse box 8 fuses. That is, with the above method of protection, the protection of the flat cable 4 is insufficient.

Note that in the above rotary connector, an example of use of a flat cable 4 was shown from the viewpoint of the ease of winding and unwinding. As explained above, however, even when using a cable with a usual round cross-section able to wind and unwind, a similar problem is encountered. The flat cable 4 or the cable accommodated inside the rotary connector corresponding to the same is called an "inner conductor" below, while the cables corresponding to the outer conductors 5A and 5B positioned outside the rotary connector are called "outer conductors".

SUMMARY OF THE INVENTION

An object of the present invention is to provide a rotary connector which can protect the inner conductor (flat cable) accommodated in the rotary connector when an overcurrent flows to the inner conductor.

The present invention provides a rotary connector wherein an inside case and an outside case are combined so as to be able to rotate relative to each other, an inner conductor is accommodated wound in a spiral in a space formed by the inside case and the outside case, and outer conductors are connected to the two ends of the inner conductor, a power supply side connection portion of the connection portions between the ends of the inner conductor and the outer conductors electrically connects the end of the inner conductor and the outer conductor through a conductive member with a smaller current capacity than the inner conductor and having a fuse function.

Preferably, the inner conductor is a flat cable.

If the power supply side (+side) connection portion of the connection portions of the ends of the inner conductor (flat cable) and outer conductors is configured so that the conductor of the flat cable and the outer conductor are electrically connected through a member having a fuse function, even if a short-circuit occurs in the circuit formed by the flat cable and outer conductors, since the member having the fuse function will fuse first, the flat cable will no longer heat and fuse.

According to another aspect of the present invention, there is provided a rotary connector comprised of an inside case; an outside case able to rotate relative to the inside case; an inner conductor accommodated in a space defined by the inside case and the outside case and wound in a spiral to be able to be wound or unwound upon relative rotation of the inside case and outside case; and connection portions having conductive members connecting the two ends of the inner conductor and outer conductors; the inner conductor and the outer connectors being connected using a conductive member with a smaller current capacity than the inner conductor for the conductive member of at least the power supply side connection portion of the connection portions.

The connection portion may be comprised of an insulative relay member; a number of strip conductors provided facing each other predetermined distances apart corresponding to the number of conductors of the inner conductor and outer conductors so as to project out from the insulative relay member; conductive members for connecting the conductors of the inner conductor and outer conductors; and supports of a predetermined height provided at positions of the facing strip conductors so that the conductive members do not contact the insulative relay member at the side where the plurality of strip conductors are provided.

Preferably, the conductive member with a smaller current capacity than the inner conductor used for a conductive member of at least the power supply side connection portion of the connection portions is comprised of strip conductive members and a fusing portion with a smaller surface area than the strip conductive members so that the current capacity is smaller than the inner conductor.

Alternatively, the connection portion is comprised of a number of facing strip conductors provided predetermined distances apart corresponding to the number of conductors of the inner conductor and outer conductors and conductive members provided between the facing strip conductors for connecting the conductors of the inner conductor and the outer conductor.

More preferably, a cylindrical conductor portion having a conductive member with a smaller current capacity than the inner conductor is used for the conductive member of at least the power supply side connection portion of the connection portions.

Alternatively, the cylindrical conductor portion having a conductive member with a smaller current capacity than the inner conductor used for the conductive member of the connection portion of at least the power supply side connection portion of the connection portions comprises a strip conductive members and a fusing portion with a smaller surface area than the strip conductive members so that the current capacity is smaller than the inner conductor.

According to still another aspect of the invention, there is provided a rotary connector comprised of an inside case; an outside case able to rotate relative to the inside case; an inner conductor accommodated in a space defined by the inside case and the outside case and wound in a spiral to be able to be wound or unwound upon relative rotation of the inside case and outside case; and a connection portion having a conductive member connecting the two ends of the inner conductor and outer conductors; a member with a resistance value which increases upon an overcurrent and which limits the current flowing through the inner conductor is used for a conductive member of at least the power supply side connection portion of the connection portions.

Preferably, the current limiting member includes a PTC element.

BRIEF DESCRIPTION OF THE DRAWINGS

These and other objects and features of the present invention will become more apparent from the following description of the preferred embodiments given with reference to the attached drawings, in which.

DESCRIPTION OF THE PREFERRED EMBODIMENTS

Figure 1:
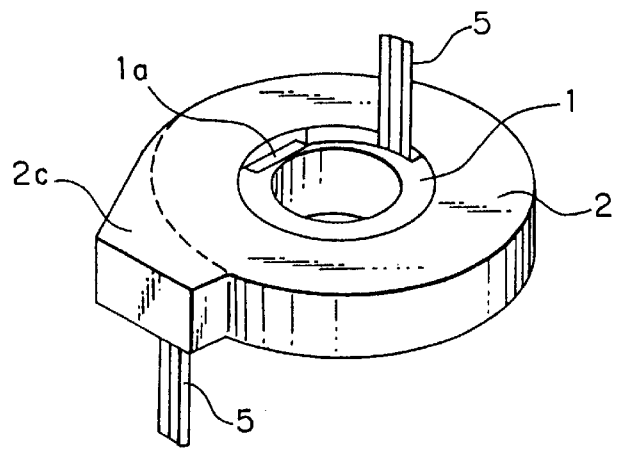
FIG. 1 is a perspective view of the outside of a rotary connector of a related art to the rotary connector of the present invention.
Figure 2:
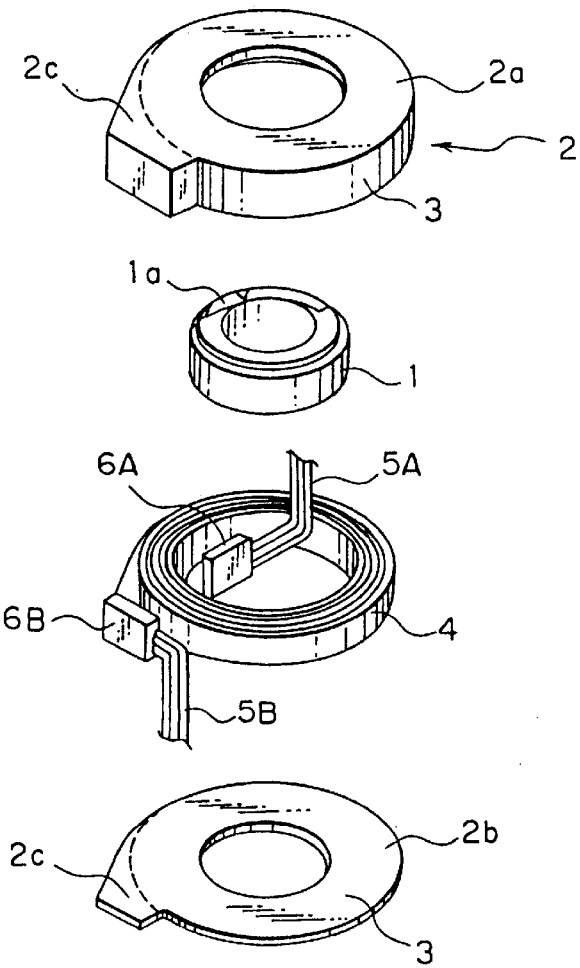
FIG. 2 is a perspective view of disassembled parts of the rotary connector illustrated in FIG. 1.

Below, the present invention will be explained in detail with reference to the drawings.
First Embodiment A rotary connector according to the present invention is similar in basic configuration to the rotary connector shown in FIG. 1 and FIG. 2. That is, the rotary connector of the first embodiment of the present invention also has, as illustrated in FIG. 1 and FIG. 2, an inside case 1 and outside case 2 combined to be able to rotate relative to each other. The outside case 2 is integrally comprised of an upper cover 2a, a lower cover 2b, and a connection accommodating inlet portion 2c. A clockwise spirally wound, from the outside to the inside, flat conductive cable, that is, a flat cable 4, is accommodated in a space 3 formed by the inside case 1 and outside case 2. Ends of the outer conductors 5A and 5B (here referred to together as the outer conductors 5) are connected to the conductors at the two ends of the flat cable 4 using the connection portions explained with reference to FIG. 4.

In the rotary connector of the first embodiment of the present invention, the connection portions 100 described below are used instead of the above connection portions 6A and 6B.

Figure 3:
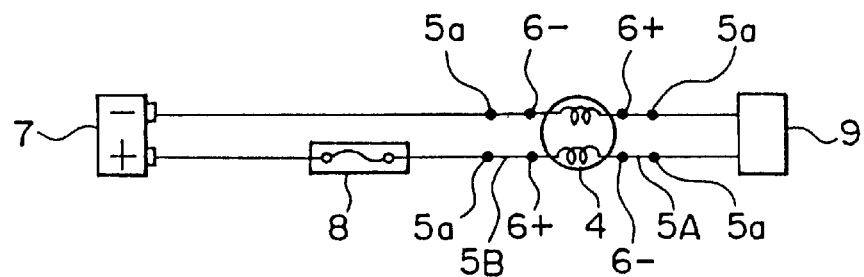
FIG. 3 is a view of an example of the configuration of the electrical circuit using the rotary connector illustrated in FIG. 1 and FIG. 2 and the rotary connector of the present invention.

The case of use of the rotary connector of the embodiment of the present invention for the circuit illustrated in FIG. 3 is explained below by way of example.

Figure 4:
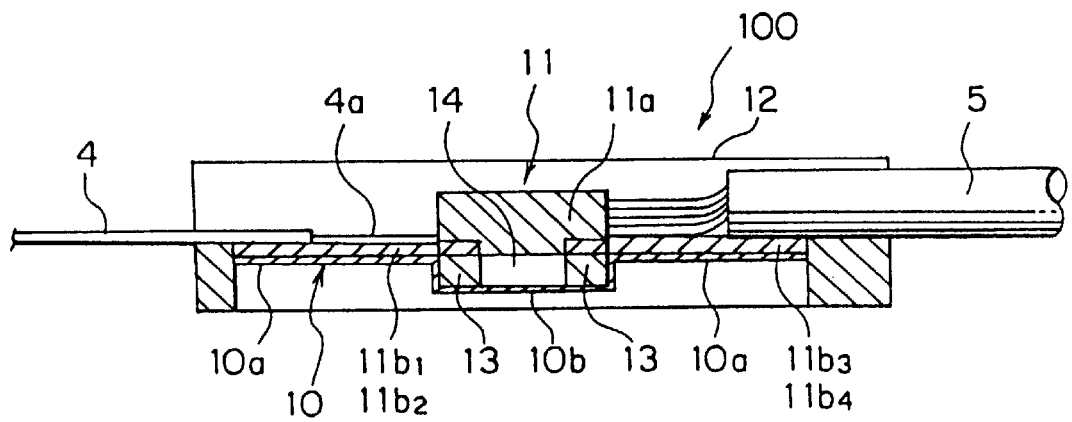
FIG. 4 is a sectional view of the connection portion of the outside conductors and the flat cable in the rotary connector of the first embodiment of the present invention.

FIG. 4 is a sectional view of a connection portion 100 of an outer conductor and flat cable in the rotary connector of the first embodiment of the present invention. This connection portion 100 corresponds to the connection portion 6A between the outer conductor 5A and the flat cable 4 or the connector portion 6B of the outer conductor 5B and flat cable 4 explained with reference to FIG. 2. In the present embodiment, connection portions 100 are used instead of the connection portions 6A and 6B. The connection portion 100 is accommodated in the portion of the inside case 1 corresponding to the connection accommodating portion 1a or the portion of the outside case 2 corresponding to the connection accommodating portion 2c illustrated in FIG. 2.

In the rotary connector of the first embodiment of the present invention, as shown in FIG. 4, of the connection portions between the conductor 4a of the flat cable 4 and the outer conductors 5 (for example, 5A), the connection portion 100 at the plus (+) side of the battery 7 shown in FIG. 3 is configured so that the conductors 4a of the flat cable 4 and the outer conductor 5 are electrically connected through members 10 having a fuse function. Details of the member 10 having the fuse function will be explained later.

Explaining the connection 100 in the rotary connector of the embodiment of the present invention in more detail referring to FIG. 4, the conductors 4a of the flat cable 4 and the outer conductor 5 are connected to the relay conductor 11.

Figure 5:
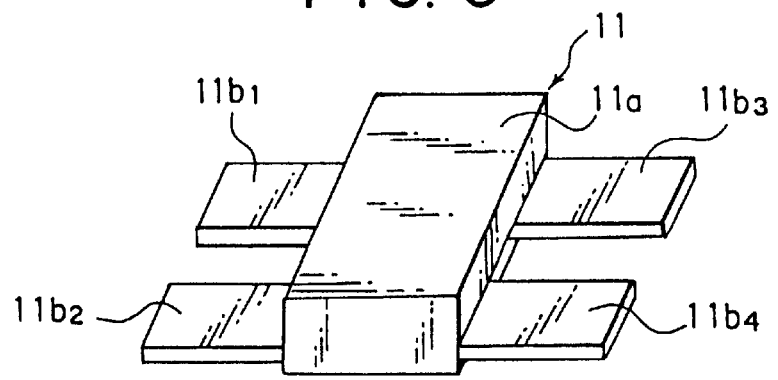
FIG. 5 is a perspective view of a relay conductor in the rotary connector shown in FIG. 4.

A relay conductor 11, as shown in FIG. 5, is provided with four strip conductors 11b1, 11b2, 11b3, and 11b4 projecting out from the two sides of an insulator 11a. Two conductors 4a of the flat cable 4 and two conductors of the outer conductors 5 are connected by for example soldering to the top of the four strip conductors 11b1, 11b2, 11b3, and 11b4.

The facing strip conductors 11b1 and 11b3 and the facing strip conductors 11b2 and 11b4 are insulated from each other by the insulator 11a. The facing strip conductors 11b1 and 11b3 and the facing strip conductors 11b2 and 11b4 are however connected by members 10 having fuse functions under the strip conductors 11b1 to 11b4 so as to electrically connect the flat cable 4 and the outer conductors 5.

Figure 6:
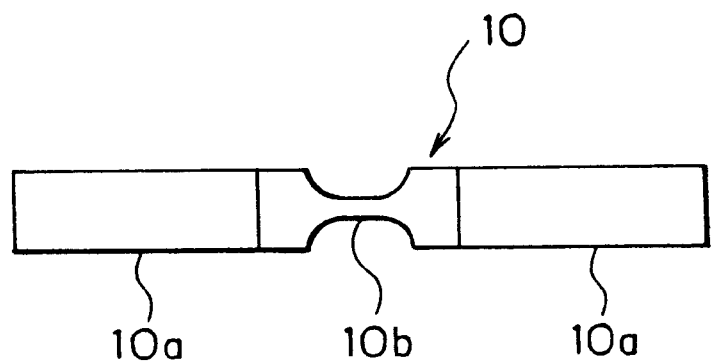
FIG. 6 is a plan view of a first example of a member having a fuse function in the rotary connector shown in FIG. 4.

As the member 10 having a fuse function, as shown in FIG. 6, use is made of a member having strip portions 10a at its two ends and a narrower fusing portion 10b which fuses due to overcurrent at its center. The current capacity of the fusing portion 10b is designed to be smaller than the current capacity of the flat cable 4.

Members 10 having fuse functions are connected to the bottoms of both of the facing strip conductors 11b1 and 11b3 at the strip portions 10a and the bottoms of both of the facing strip conductors 11b2 and 11b4 at the strip portions 10a. Note that when connecting the strip portions 10a of the members 10 having fuse functions to the bottoms of the facing strip conductors 11b1 and 11b3 and the bottoms of the facing strip conductors 11b2 and 11b4, the fusing portions 10b are prevented from contacting the insulator 11a of the relay conductor 11 by using the supports 13 so that the fusing portions 10b are bent so as to be positioned below the insulator 11a. Using the supports 13, spaces 14 are defined between the fusing portions 10b and the bottom of the relay conductor 11.

The fusing portions 10b of the members 10 having a fuse function are kept from contacting the bottom of the insulator 11a of the relay conductor 11 by the supports 13 so as to keep the fusing portions 10b from being affected by the insulator 11a and to keep the fusing portions 10b from melt bonding with the insulator 11a when fusing.

Note that the connection portions 100 connecting the outer conductors 5 and flat cable 4 using the relay conductor 11 comprised of the insulator 11a and the strip conductors 11b1 to 11b4 projecting out from the insulator 11a are electrically isolated from the outside by the insulating cover 12.

The connection portions 100 between the conductors 4a of the flat cable 4 and the conductors of the outer conductors 5 in the rotary connector of the first embodiment of the above configuration are designed so that the fusing portions 10b of the members 10 having fuse functions will fuse earlier than the flat cable 4 when an overcurrent flows in the flat cable 4. Accordingly, it is possible to protect the flat cable 4 when a short-circuit etc. causes an overcurrent to flow into the flat cable 4.

Even if the fusing portion 10b of the member 10 having a fuse function fuses due to an overcurrent, replacement of a member 10 having a fuse function is easier compared with replacement of a fused flat cable 4.

A member 10 having a fuse function is cheaper than a flat cable 4, so even if the fusing portion 10b fuses, it is more advantageous price wise to replace the member 10 having a fuse function rather than replace a flat cable 4.

Further, as explained above, since the current capacity of the fusing portion 10b of the member 10 having a fuse function is designed to be smaller than the current capacity of the flat cable 4 so as to make the fusing portion 10b fuse by an overcurrent earlier than the fusing of the flat cable 4 so as to protect the flat cable 4.
Second Embodiment Next, a rotary connector according to second embodiment of the present invention will be explained.

Figure 7:
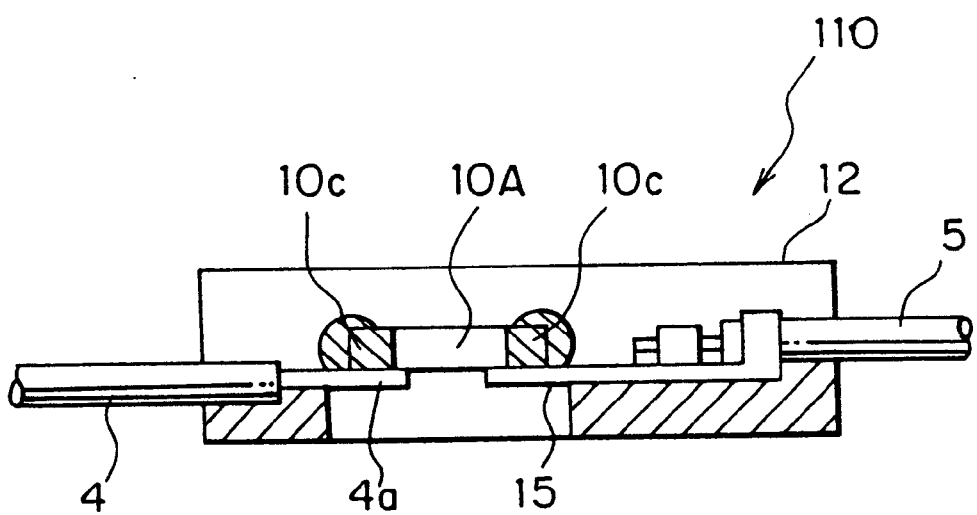
FIG. 7 is a sectional view of the connection portion of the outside conductors and the flat cable in the rotary connector of the second embodiment of the present invention.

FIG. 7 is a cross-sectional view of a connection portion 110 between an outside conductor and flat cable in a rotary connector according to a second embodiment of the present invention. FIG. 7 shows a connection portion 110 corresponding to the connection portion 100 illustrated in FIG. 4.

The inside case 1 and the outside case 2 are similar to those explained in the first embodiment.

In FIG. 7, a terminal fitting 15 is connected to the end of the outer conductor 5. The terminal fitting 15 and the conductor 4a of the flat cable 4 are connected through a member 10A having a fuse function. The member 10A having a fuse function is provided with cylindrical conductor portions 10c at its two ends. The conductor portions 10c are connected to the terminal fitting 15 and the conductor 4a of the flat cable 4.

In the second embodiment as well, the current capacity of the cylindrical conductor portions 10c is set smaller than the current capacity of the flat cable 4. When an overcurrent flows through the flat cable 4 due to a short-circuit etc., the cylindrical conductor portions 10c will fuse earlier than the flat cable 4.

Note that the conductor, portions 10c provided at the two ends of the member 10A having a fuse function are not limited to the cylindrical shapes illustrated in FIG. 7 and may be formed as strips as illustrated in FIG. 6.

Other Embodiments

As the members 10 and 10A having the fuse function, use may be made not only of ones having the above fusing portions 10b and 10c, but also PTC elements not having fusing portions. PTC elements are negative resistance effect elements. When an overcurrent flows, the temperature rises, the resistance grows, and the current is limited. As a result, it is possible to prevent an overcurrent from flowing to the flat cable 4.

It is possible to interpose a member having a fuse function at all connection portions of the conductors 4a of the flat cable 4 with the outer conductors, but it is sufficient to interpose members having a fuse function at the plus side connection portions of the conductors 4a of the flat cable 4 and the conductors of the outer conductors.

Further, when using a relay conductor 11 as illustrated in FIG. 5, the number of the strip conductors such as the strip conductors 11b1 to 11b4 projecting out from the insulator 11a may be increased in accordance with the number of the conductors of the flat cable.

Further, the spirally wound flat cable 4 may be structured with a U-shaped turnback portion in the middle. Further, it is possible to use a usual round cable as the inner conductor of the rotary connector of the present invention.

As explained above, the present invention provides a rotary connector wherein an inside case and an outside case are combined so as to be able to rotate relative to each other, a flat cable is accommodated wound in a spiral in a space formed by the inside case and the outside case, and outer conductors are connected to the conductors at the two ends of the flat cable, where a plus side connection portion of the connection portions between the conductors of the flat cable and the outer conductors electrically connects a conductor of the flat cable and an outer conductor through a member having a fuse function or an element limiting the flow of an overcurrent.

When the fusing portion of a member having a fuse function fuses due to an overcurrent, replacement of the member having a fuse function is easier compared with replacement of a fused inner conductor (flat cable). Further, since a member having a fuse function is cheaper than an inner conductor, even if the fusing portion of the member having a fuse function fuses, it is more advantageous price wise to replace the member having a fuse function rather than replace an inner conductor.

Further, in the present invention, since the current capacity of the member having a fuse function is designed to be smaller than the current capacity of the inner conductor (flat cable) so as to make the fusing portion fuse by an overcurrent earlier than the fusing of the inner conductor so as to protect the flat cable 4, there is an advantage in the circuit design, that is, it is not necessary to decide on the current capacity of the fusing portion considering the outside circuit conditions of the rotary connector, for example, the capacity of the fuse of the fuse box.

Even if the member having a fuse portion fuses due to an overcurrent, only the fusing portion melts, so there is greater safety compared with the heating and fusing of the flat cable.

While the invention has been described by reference to specific embodiments chosen for purposes of illustration, it should be apparent that numerous modifications could be made thereto by those skilled in the art without departing from the basic concept and scope of the invention.

We claim:

1. A rotary connector comprising:

inside case;

an outside case able to rotate relative to the inside case;

an inner conductor accommodated in a space defined by the inside case and the outside case and wound in a spiral to be able to be wound or unwound upon relative rotation of the inside case and outside case; and connection portions having conductive members connecting the two ends of the inner conductor and outer conductors;

the inner conductor and the outer connectors being connected using a conductive member with a smaller current capacity than the inner conductor for the conductive member of at least the power supply side connection portion of the connection portions.

2. A rotary connector as set forth in claim 1, wherein a connection portion comprises:

an insulative relay member;

a number of strip conductors provided facing each other predetermined distances apart corresponding to the number of conductors of the inner conductor and outer conductors so as to project out from the insulative relay member;

conductive members for connecting the conductors of the inner conductor and outer conductors; and supports of a predetermined height provided at positions of the facing strip conductors so that the conductive members do not contact the insulative relay member at the side where the plurality of strip conductors are provided.

3. A rotary connector as set forth in claim 1, wherein the conductive member with a smaller current capacity than the inner conductor used for a conductive member of at least the power supply side connection portion of the connection portions, comprises:

strip conductive members and a fusing portion with a smaller surface area than the strip conductive members so that the current capacity is smaller than the inner conductor.

4. A rotary connector as set forth in claim 2, wherein the conductive member with a smaller current capacity than the inner conductor used for a conductive member of at least the power supply side connection portion of the connection portions, comprises:

strip conductive members and a fusing portion with a smaller surface area than the strip conductive members so that the current capacity is smaller than the inner conductor.

5. A rotary connector as set forth in claim 1, wherein the inner conductor is a flat cable.

6. A rotary connector as set forth in claim 1, wherein said connection portion comprises:
- a number of facing strip conductors provided predetermined distances apart corresponding to the number of conductors of the inner conductor and outer conductors and
- conductive members provided between said facing strip conductors for connecting the conductors of said inner conductor and said outer conductors.

7. A rotary connector as set forth in claim 6, wherein a cylindrical conductor portion having a conductive member with a smaller current capacity than said inner conductor is used for said conductive member of at least the power supply side connection portion of the connection portions.

8. A rotary connector as set forth in claim 6, wherein said a cylindrical conductor portion having a conductive member with a smaller current capacity than said inner conductor used for said conductive member of the connection portion of at least the power supply side connection portion of the connection portions comprises a
- strip conductive members and
- a fusing portion with a smaller surface area than said strip conductive members so that the current capacity is smaller than said inner conductor.

9. A rotary connector as set forth in claim 1, wherein the inner conductor is a flat cable.

10. A rotary connector comprising:
- an inside case;
- an outside case able to rotate relative to said inside case;
- an inner conductor accommodated in a space defined by said inside case and said outside case and wound in a spiral to be able to be wound or unwound upon relative rotation of said inside case and outside case; and
- connection portions having conductive members connecting the two ends of said inner conductor and outer conductors;
- a member with a resistance value which increases upon an overcurrent and which limits the current flowing through said inner conductor is used for a conductive member of at least the power supply side connection portion of the connection portions.

11. A rotary connector as set forth in claim 7, wherein the current limiting member includes a PTC element.

12. A rotary connector as set forth in claim 10, wherein the inner conductor comprises a flat cable.

13. A rotary connector wherein an inside case and an outside case are combined so as to be able to rotate relative to each other, an inner conductor is accommodated wound in a spiral in a space formed by said inside case and said outside case, and outer conductors are connected to the two ends of said inner conductor,
- a power supply side connection portion of the connection portions between the ends of said inner conductor and said outer conductors electrically connects an end of the inner conductor and an outer conductor through a conductive member with a smaller current capacity than said inner conductor and having a fuse function.

14. A rotary connector as set forth in claim 13, wherein the inner conductor is a flat cable.

* * * * *